(12) United States Patent
Budaya et al.

(10) Patent No.: US 8,676,748 B2
(45) Date of Patent: *Mar. 18, 2014

(54) CLEARING METADATA TRACKS IN A STORAGE SYSTEM

(75) Inventors: Angelique R Budaya, Tucson, AZ (US); Aaron S Mahar, Tucson, AZ (US); James A Springer, Tucson, AZ (US); Warren K Stanley, Loveland, CO (US); Gail A Spear, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1581 days.

This patent is subject to a terminal disclaimer.

(21) Appl. No.: 10/993,048

(22) Filed: Nov. 18, 2004

(65) Prior Publication Data

US 2006/0106829 A1    May 18, 2006

(51) Int. Cl.
*G06F 17/30* (2006.01)
(52) U.S. Cl.
USPC .......................................................... 707/609
(58) Field of Classification Search
None
See application file for complete search history.

(56) References Cited

U.S. PATENT DOCUMENTS

| | | | |
|---|---|---|---|
| 4,989,136 A | | 1/1991 | Gurd et al. |
| 5,408,653 A | * | 4/1995 | Josten et al. .................. 707/8 |
| 5,410,667 A | | 4/1995 | Belsan et al. |
| 5,442,758 A | * | 8/1995 | Slingwine et al. .................. 707/8 |
| 5,745,753 A | * | 4/1998 | Mosher, Jr. .................. 707/202 |
| 5,761,660 A | * | 6/1998 | Josten et al. .................. 707/8 |
| 5,761,678 A | * | 6/1998 | Bendert et al. .................. 707/204 |
| 5,778,168 A | | 7/1998 | Fuller |
| 5,870,753 A | | 2/1999 | Chang et al. |
| 5,897,661 A | | 4/1999 | Baranovsky |
| 6,052,759 A | | 4/2000 | Stallmo et al. |
| 6,292,869 B1 | | 9/2001 | Gerchman et al. |
| 6,298,425 B1 | | 10/2001 | Whitaker et al. |
| 6,308,182 B1 | | 10/2001 | Nishigaya et al. |
| 6,339,793 B1 | | 1/2002 | Bostian et al. |
| 6,438,661 B1 | | 8/2002 | Beardsley et al. |
| 6,502,174 B1 | | 12/2002 | Beardsley et al. |

(Continued)

FOREIGN PATENT DOCUMENTS

| | | |
|---|---|---|
| EP | 1193899 | 4/2002 |
| WO | WO 03/028293 | 9/2002 |

OTHER PUBLICATIONS

IBM TDB, "Progressive Transaction Recovery Scheme for Distributed DB/DC Systems," NN8708972, Aug. 1, 1987.*

(Continued)

*Primary Examiner* — Mahesh Dwivedi
(74) *Attorney, Agent, or Firm* — Dan Shifrin

(57) ABSTRACT

Methods, systems, computer program products and methods for deploying computing infrastructure for clearing metadata in a storage subsystem. The method includes identifying one or more metadata tracks to clear, receiving a request from a client to clear the identified tracks, quiescing any active processes, clearing the identified tracks and resuming the quiesced processes. The request may be a single request operable to clear all metadata tracks. Alternatively, target volumes having metadata tracks to be cleared are identified and a request is received from a client for each target volume. A dynamic function list may also be created for each target volume, the list including a list of functions in which the target volume is associated. After active processes are quiesced, each function in the dynamic function list of each target volume is invoked whereby the metadata tracks are cleared. The quiesced processes are then resumed.

38 Claims, 4 Drawing Sheets

(56) References Cited

U.S. PATENT DOCUMENTS

| | | |
|---|---|---|
| 6,697,846 B1 | 2/2004 | Soltis |
| 6,714,930 B1 | 3/2004 | Garrison et al. |
| 6,725,392 B1 | 4/2004 | Frey et al. |
| 6,751,705 B1 | 6/2004 | Solomon et al. |
| 6,769,124 B1 | 7/2004 | Schoening et al. |
| 7,039,661 B1* | 5/2006 | Ranade .................... 707/204 |
| 7,099,995 B2* | 8/2006 | Springer et al. .............. 711/114 |
| 2002/0107878 A1* | 8/2002 | Tsuchida et al. ............. 707/204 |
| 2002/0112125 A1 | 8/2002 | Copeland et al. |
| 2003/0088750 A1 | 5/2003 | Wu et al. |
| 2003/0093770 A1 | 5/2003 | Fernandez |
| 2003/0177130 A1 | 9/2003 | Todd |
| 2005/0081099 A1* | 4/2005 | Chang et al. ..................... 714/15 |
| 2005/0193230 A1* | 9/2005 | Springer et al. .................. 714/5 |
| 2006/0106971 A1* | 5/2006 | Mahar et al. .................. 711/100 |

OTHER PUBLICATIONS

IBM TDB, "Method of Table Update Serialization without Accessor Quiescence," NN920714, Jul. 1, 1992.*

* cited by examiner

CLEARING METADATA TRACKS IN A STORAGE SYSTEM

RELATED APPLICATION DATA

The present application is related to commonly assigned and copending U.S. application Ser. Nos. 10/993,092, entitled SELECTIVE CLEARING OF PERSISTENT METADATA IN A STORAGE SUBSYSTEM; 10/993,022, entitled MANAGEMENT OF METADATA IN A STORAGE SUBSYSTEM; 10/993,087, entitled MANAGING ATOMIC UPDATES ON METADATA TRACKS IN A STORAGE SYSTEM, filed on the filing date hereof, which applications are incorporated herein by reference in their entirety.

TECHNICAL FIELD

The present invention relates generally to enterprise storage systems and, in particular, to efficiently clearing metadata tracks in a storage subsystem.

BACKGROUND ART

Enterprise computing systems typically include one or more host systems for processing customer data and running application programs, direct access storage devices (DASDs) for storing the data, and one or more storage controllers for directing the storage and retrieval of data between the host(s) and the DASDs. In addition to the customer data, the storage controller typically maintains metadata which provides information about tracks or blocks of data in the DASD or in cache storage in the storage controller. The storage controller processes the metadata during certain operations on the customer data represented by the metadata to improve the speed and efficiency with which requested operations are performed. During DASD initialization, metadata is staged from disk to cache storage (a volatile type of storage). A power failure or certain other types of errors may cause the contents of the cache to be lost.

Certain storage controllers, such as the IBM™ Enterprise Storage Server™ (ESS), may be configured with copy services functionality, including (but not limited to) flash copy, peer-to-peer remote copy, extended remote copy and concurrent copy, which assist in backing up data and recovering from disasters. During a copy service (CS) operation, multi-field CS metadata is generated and maintained by the storage controller. The CS metadata includes information about the state of a copy services operation at any point in time, such as internal settings, source and destination addresses, and other data about the state of data being copied. Consequently, if a controller loses power or encounters some other interrupting event, the controller may be restarted, the metadata read, the CS operation restored to the point of interruption and then resumed and completed.

Metadata may be either global or segmented. Global metadata is stored in reserved sections of the disk storage, independent of the associated customer data volumes; for security, three separate copies are kept. Segmented metadata is stored in a reserved section of a customer volume itself; only one copy is kept.

Journaling has been implemented to allow storing metadata updates in non-volatile storage (NVS), improving update performance and maintaining the metadata in the event of a power loss or other significant event. Each metadata track has a corresponding page in NVS which includes a chain of blocks containing a sequence of journal entries identifying an operation being performed and the data in cache being modified. During a recovery operation, the metadata may be staged from disk to cache and the changes previously recorded in the journal entries applied, thereby restoring the metadata to have the most current version of data.

On occasion, a significant problem in the storage subsystem may require that metadata, such as CS control data, be cleared to restore full function of the system or to clean up problems caused by corruption of the metadata. In the past, it was necessary to completely shut down the system, issue the appropriate clear commands and bring the system back up. Such a procedure was time consuming and disruptive to normal customer operations.

In response, a routine was developed to allow customers to issue clear commands while the storage subsystem was running in a normal operation mode. However, complications may arise if metadata is cleared while I/O requests and other threads or processes continue to run. In such an event, a process using data being cleared may not be able to handle the sudden loss of data, possibly causing a system shutdown. Consequently, it is desirable for a procedure which allows metadata to be cleared without adversely affecting currently running I/O and other processes.

A 'clear status tracks' (CST) command has been used to clear all metadata tracks, requiring them to be rebuilt. However, a CST command also clears all customer data for all logical subsystems and the volumes they control. Moreover, a CST command requires a system shutdown and power-up before being executed, thereby disrupting normal customer operations. Thus, a different command, 'clear metadata tracks' (CMT), was developed to limit the number and type of tracks which would be cleared. The aforementioned co-pending and commonly assigned U.S. application Ser. No. 10/993,092, entitled SELECTIVE CLEARING OF PERSISTENT GLOBAL METADATA IN A STORAGE SUBSYSTEM, describes the CMT command. The CMT command may be used to clear metadata for many different types of operations, such as many types of CS operations or a reset logical unit number (LUN) operation. A storage subsystem, a single logical subsystem (LSS) or a volume may become the target of a CMT operation. In operation, A CST operation may be performed in either of two ways. A CMT will loop over all of the participating targets while invoking all of the CMT operation functions and testing each function to determine if the operation is required for the particular target. If so, the operation will be performed. Alternatively, the CMT will loop over all of the operations, then loop over all of the targets to determine if the operation is required for the particular target. Again, if so, the operation will be performed. More specifically, in the first method, the LSS's are examined. For each LSS, it is determined which CMT commands were issued which targeted the LSS. For each such command, it is determined whether the command pertains to a volume or volumes on the LSS. If so, it is next determined whether the CMT command is valid for that volume(s) and, if so, the CMT function is invoked to clear the volume metadata. If, on the other hand, the GMT command pertains to the LSS, it is determined whether the CMT command is valid for that LSS and, if so, the CMT function is invoked to clear the LSS metadata. Alternatively, in the second method of performing a CMT operation, the CMT commands are examined. For each command, the LSS's targeted by the command are examined. For each such LSS, it is determined whether the command is valid and, if so, the CMT function is invoked to clear the LSS metadata. For each command, the volumes targeted by the command are also examined. For each such volume, it is determined whether the command is valid and, if so, the CMT function is invoked to clear the volume metadata. Consequently, it is desirable for a procedure to more efficiently invoke all of the appropriate functions on all of the target entities and clear required metadata.

The CMT command described in U.S. application Ser. No. 10/993,092 requires a system operator to know the type of metadata to be cleared as well as the identity of the volumes or LSS's for which the clearing is required. Thus, a separate CMT command must be issued for each type of metadata. Moreover, there is a different type of metadata associated with each CS function. In the event that the operator cannot determine which specific type of CS metadata should be cleared, the operator may need to clear all CS metadata but still preserve other persistent data. To do so, the operator must issue a large number of separate CMT commands. Consequently, it is desirable for a procedure to enable a more efficient clearing of all metadata tracks.

SUMMARY OF THE INVENTION

The present invention provides methods for clearing metadata in a storage subsystem. The method includes identifying one or more metadata tracks to clear, by receiving a request from a client to clear tracks on target LSS's or volumes, quiescing any active processes, clearing the identified tracks and resuming the quiesced processes.

In one embodiment, the request is a single request and operable to clear all metadata tracks. In another embodiment, target volumes having metadata tracks to be cleared are identified and a request is received from a client for each target volume. A dynamic function list is created for each target volume, the list including list only of those CMT functions which were made on the target volume. After active processes are quiesced, each CMT function in the dynamic function list of each target volume is invoked whereby the metadata tracks are cleared. The quiesced processes are then resumed.

The present invention also provides systems, computer program products and methods for deploying computing infrastructure for clearing metadata in a storage subsystem.

DETAILED DESCRIPTION OF THE PREFERRED EMBODIMENT

Figure 1:
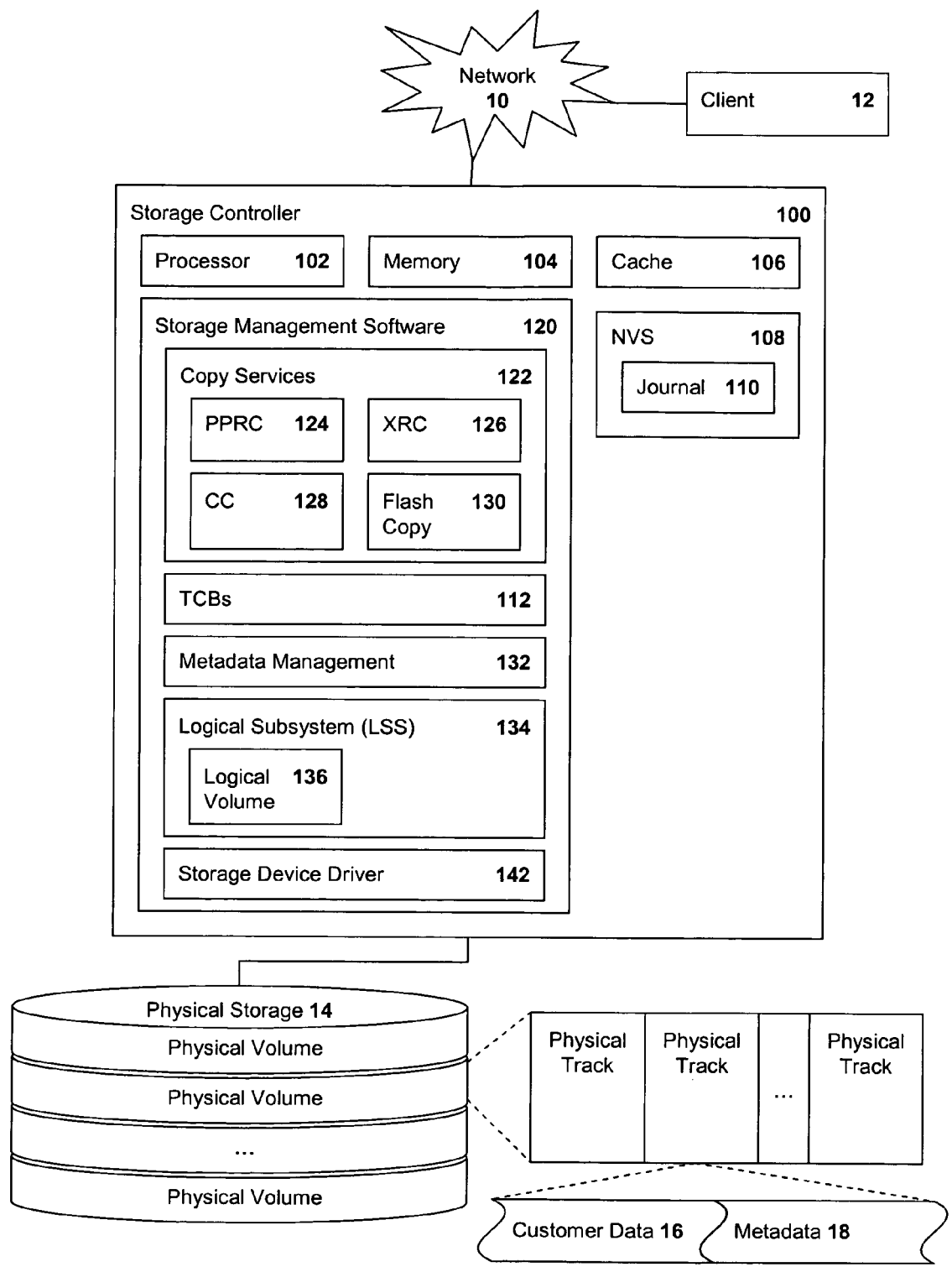
FIG. 1 is a block diagram of a metadata management system of the present invention.

FIG. 1 is a block diagram of a storage controller 100 implementing metadata clearing of the present invention. The controller 100 is attached, through a network 10, to at least one client system 12, such as a host device. The controller 100 is also attached to at least one storage device 14, such as direct access storage devices (DASDs).

The controller 100 includes a processor 102, general memory 104 for storing computer-readable code having instructions executable by the processor 102, a cache storage 106 and non-volatile storage (NVS) 108. The NVS 108 includes a journaling area 110; the controller 100 further includes storage management software 120 which may actually be stored in the memory 104. The storage management software 120 may include copy services (CS) code 122 and metadata management code 132. Copy services code 122 may include, but are not limited to, a peer-to-peer remote copy (PPRC) function 124, an extended remote copy (XRC) function 126, a concurrent copy (CC) function 128 and/or a flash copy or point-in-time copy function 130. Such services assist in backing up data, copying data and recovering from disasters.

The storage management software 120 further includes task control blocks 112, one or more logical subsystems (LSS) 134, configured into one or more logical volumes 136, and a storage device driver 142. In some storage controllers, both the cache 106 and the NVS 108 may be microcode constructs within the memory 104, configured by, and considered to be a part of, the device driver 142.

The storage device 14 may be configured into tracks having both customer data 16 and metadata 18. As previously noted, metadata may be either global, stored separate from the corresponding customer data (as illustrated in FIG. 1), or segmented, stored with the corresponding customer data.

Figure 2:
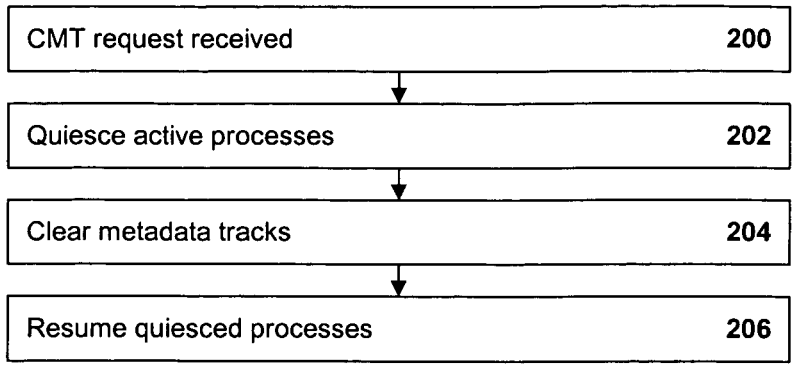
FIG. 2 is a flowchart of one embodiment of the present invention.

Referring to the flowchart of FIG. 2, when a system operator determines that metadata must be cleared, the operator issues a 'clear metadata tracks' command (step 200). The command includes an identification of the track or tracks to be cleared. If any I/O requests are being processed or any other threads or processes are active, they are temporarily halted or quiesced (step 202), such as with a second command issued by the operator. The identified metadata tracks are then cleared (step 204) and the quiesced I/O and processes are resumed (step 206).

Figure 3:
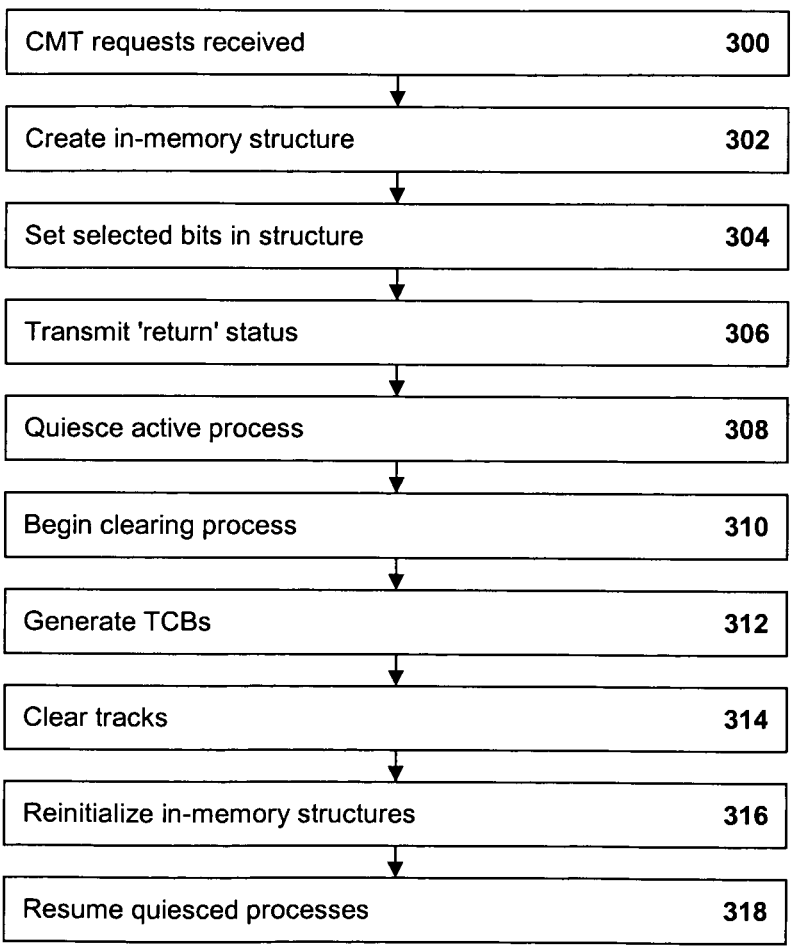
FIG. 3 is a flowchart of another embodiment of the present invention.

More specifically, and referring now to the flowchart of FIG. 3, when a CMT request is received by the metadata management code 132 (step 300), an in-memory structure is created to record the request (step 302). The structure includes the metadata to be targeted by the clearing operation. Alternatively, the structure includes the LSS or volume with which a metadata track is associated; internal routines may later be performed to map from the identified volume to the necessary metadata tracks. The structure may also include a set of flags or bits representative of the types of metadata clearing operations. In response to the received request, one or more bits are set according to the specific desired clearing operation(s) (step 304). The operator submits requests for all of the different types of metadata to be cleared and waits for a 'return' status, indicating that the requests have been successfully received by the metadata management code 132. Preferably, the bits are organized to enable the requests to be grouped according to the level of clearing required; that is, on a storage subsystem level, an LSS level or a volume level. This enables related requests to be run in an efficient, substantially parallel fashion.

After the 'return' status is received by the operator (step 306), the operator issues a second command to quiesce any active I/O requests or other active threads or processes (step 308). The clearing process then begins with the structures, including the bits, being read (step 310). Task control blocks 112 are generated and dispatched to clear the targeted metadata (step 312), substantially in parallel. When all of the targeted metadata tracks have been cleared (step 314), the in-memory structures are reinitialized (step 316) and the quiesced I/O and other processes are allowed to resume (step 318). By delaying the metadata clearing until active processes have been quiesced, data integrity is preserved. Moreover, configuration data remains intact, reducing the need for a complete shutdown and re-start of the system 100.

Figure 4:
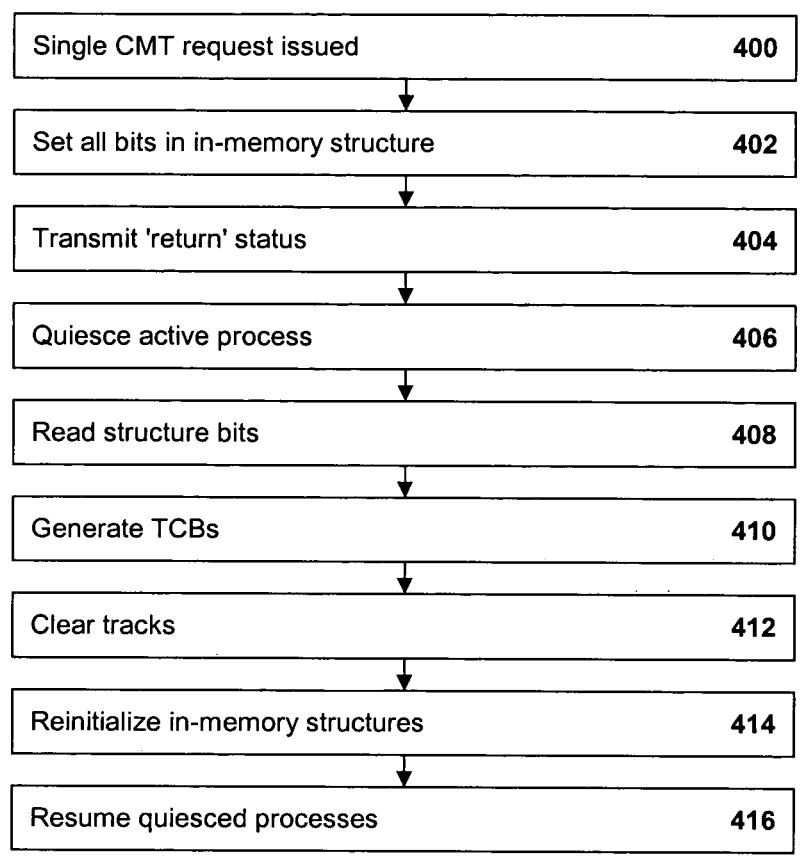
FIG. 4 is a flowchart of still another embodiment of the present invention.

The flowchart of FIG. 4 illustrates another embodiment of the present invention. Rather than the operator issuing a separate CMT command for each CS function on every LSS and every volume configured on the storage subsystem 100 as in the preceding embodiment, the operator issues a single request (step 400). The request is recorded by the metadata management code 132 by setting all of the CMT bits in the in-memory CMT control structure (step 402). The operator waits for a "return" status, indicating that the request has been successfully received by the metadata management code 132 (step 404). After the 'return' status is received by the operator, the operator issues a second command to quiesce any active I/O requests or other active threads or processes (step 406). The clearing process then begins with the structures, including the bits, being read (step 408). Task control blocks 112 are generated and dispatched to clear the targeted metadata (step 410), substantially in parallel. When all of the targeted metadata tracks have been cleared (step 412), the in-memory structures are reinitialized (step 414) and the quiesced I/O and other processes are allowed to resume (step 416). Again, by delaying the metadata clearing until active processes have been quiesced, data integrity is preserved and configuration data remains intact.

Figure 5:
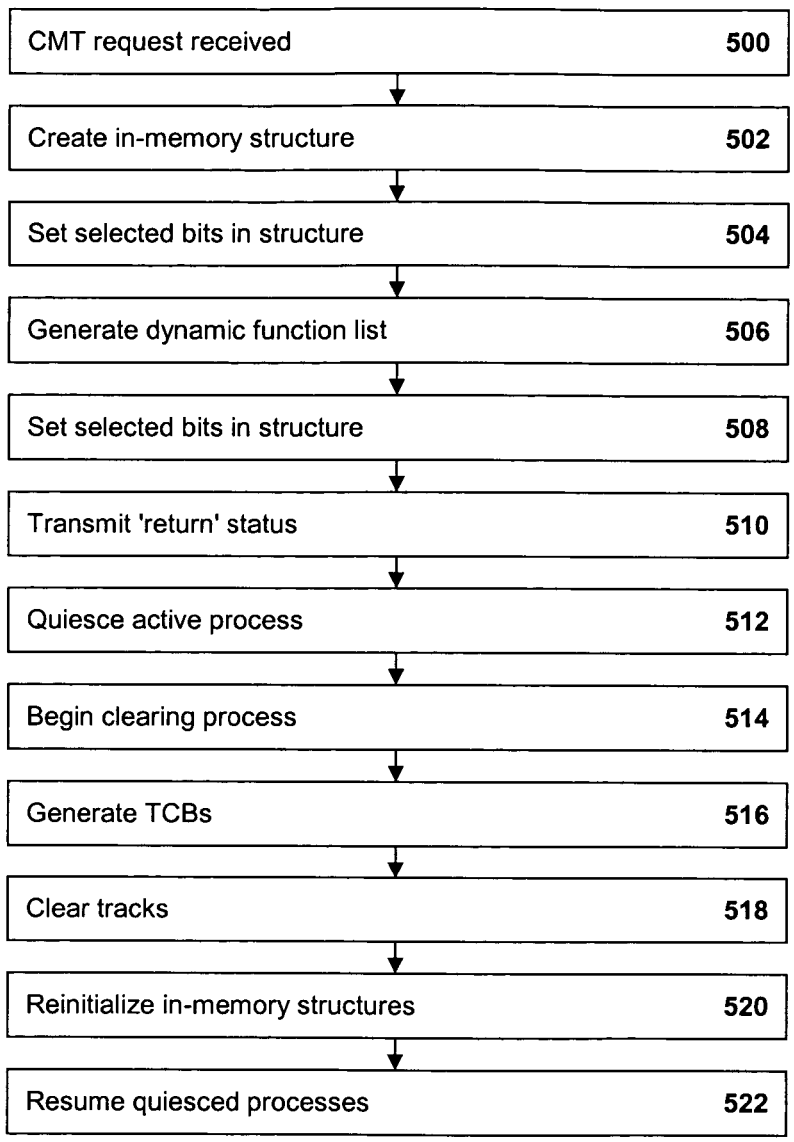
FIG. 5 is a flowchart of a further embodiment of the present invention

FIG. 5 is a flowchart of still another embodiment of the present invention. As in the embodiment of FIG. 3, when a CMT request is received by the metadata management code 132 (step 500), an in-memory structure is created to record the request (step 502). The structure includes the metadata to be targeted by the clearing operation. Alternatively, the structure includes the identity (such as by address or pointer) LSS or volume with which an metadata track is associated; internal routines may be performed to map from the identified volume to the necessary metadata tracks. The structure may also include a set of flags or bits representative of the types of metadata clearing operations. In response to the received request, one or more bits are set according to the specific desired clearing operation(s) (step 504). The operator submits requests for all of the different types of metadata to be cleared and waits for a "return" status, indicating that the requests have been successfully received by the metadata management code 132.

As each request is received, or when all of the requests have been received, the metadata management code 132 generates a dynamic function list for each volume having metadata to be cleared (step 506). Instead of a static list of CS functions which is run through for all CMT operations, it is determined which CMT functions have been requested for a target volume. The dynamic function list for each target volume thus includes only those CMT functions (based on, for example, the type of CS in which the target volume participates) which need to be performed on the associated volume. For each volume, the appropriate bits in the in-memory control structure, which represent the different CS functions, are set to indicate that the volume participates in the specified CS functions (step 508). Thus, it is no longer necessary for the CMT procedure to loop through a static list of all possible CMT functions for all volumes, even if certain of the functions won't apply to certain of the volumes.

After the 'return' status is received by the operator (step 510), the operator issues a command to quiesce any active I/O requests or other active threads or processes (step 512). The clearing process then begins with the structures, including the bits, being read (step 514). Task control blocks 112 are generated and dispatched to clear the targeted metadata (step 516), substantially in parallel. When all of the targeted metadata tracks have been cleared (step 518), the in-memory structures are reinitialized (step 520) and the quiesced I/O and other processes are allowed to resume (step 522).

It is important to note that while the present invention has been described in the context of a fully functioning data processing system, those of ordinary skill in the art will appreciated that the processes of the present invention are capable of being distributed in the form of a computer readable medium of instructions and a variety of forms and that the present invention applies regardless of the particular type of signal bearing media actually used to carry out the distribution. Examples of computer readable media include recordable-type storage media such as a floppy disk, a hard disk drive, a RAM, and CD-ROMs. Examples of transmission type media include digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for efficiently clearing metadata tracks in a storage subsystem or a method for deploying computing infrastructure comprising integrating computer readable code into a computing system for efficiently clearing metadata tracks in a storage subsystem.

What is claimed is:

1. A method for clearing metadata in a storage subsystem of a storage controller coupled to a host device and at least one direct access storage device (DASD), the direct access storage device configured into tracks having customer data and metadata, the method comprising:
   identifying one or more of a plurality of types of metadata tracks, stored on a direct access storage device in the storage subsystem, to clear, the type of metadata selected from a group consisting of a storage controller level, a logical subsystem level and a volume level;
   receiving a clear metadata tracks (CMT) request from a client to clear metadata tracks, the CMT request including an identification of a metadata type and an identification of one or more metadata tracks associated with the metadata type;
   after receipt of the CMT request, quiescing any processes active in the storage subsystem;
   clearing the identified metadata tracks substantially in parallel; and
   resuming the quiesced processes after the identified metadata tracks have been cleared.

2. The method of claim 1, further comprising creating one or more in-memory structures, each containing an identified metadata type and the one or more metadata tracks associated with the metadata type.

3. The method of claim 1, further comprising creating one or more in-memory structures, each containing an identified metadata track and an identified metadata type with which the metadata track is associated.

4. The method of claim 1, further comprising, after receipt of the CMT request and before quiescing any active processes:
   transmitting an acknowledgement of receipt of the CMT request to the client; and receiving a quiesce command from the client to initiate performance of the quiescing of active processes.

5. The method of claim 1, wherein the request comprises a single CMT command executable to clear all metadata tracks on the storage subsystem without affecting storage subsystem configuration data.

6. The method of claim 5, further comprising;
creating an in-memory structure containing an identifier identifying one or more metadata tracks associated with a metadata type; and
upon receipt of the CMT request, setting an indication in the structure that all metadata tracks are to be cleared.

7. The method of claim 1, wherein one or more volumes is a target of the CMT request, the method further comprising:
after receiving the CMT request, generating a dynamic function list for each target volume, the dynamic function list including a list of functions in which the target volume is associated; and
in response to the CMT request, invoking each function in the dynamic function list on the respective target volumes.

8. The method of claim 7, wherein the functions in the function list comprise copy services functions selected from a group comprising flash copy, peer-to-peer remote copy, extended remote copy and concurrent copy.

9. A method for clearing global metadata (metadata) in a storage subsystem of a storage controller coupled to a host device and at least one direct access storage device (DASD), the direct access storage device configured into tracks having customer data and metadata, the method comprising:
receiving a single clear metadata tracks (CMT) request from a client to clear all global metadata (metadata) tracks associated with the storage subsystem, the metadata tracks being stored on a direct access storage device in the storage subsystem;
quiescing any processes active in the storage subsystem after receipt of the CMT request;
clearing the metadata tracks substantially in parallel without affecting storage subsystem configuration data; and
resuming the quiesced processes after the identified metadata tracks have been cleared.

10. The method of claim 9, further comprising, after receipt of the CMT request and before quiescing any active processes:
transmitting an acknowledgement of receipt of the CMT request to the client; and
receiving a quiesce command from the client to initiate performance of the quiescing of active processes.

11. The method of claim 9, further comprising:
setting all CMT bits in an in-memory control structure;
detecting the set bits; and
generating one or more task control blocks to execute the clearing of the metadata tracks.

12. A method for clearing metadata a storage subsystem of a storage controller coupled to a host device and at least one direct access storage device (DASD), the storage device configured into tracks having customer data and metadata, the method comprising:
identifying one or more target volumes having one or more metadata tracks, stored on a direct access storage device in the storage subsystem, to clear;
receiving a clear metadata tracks (CMT) request from a client for each target volume;
generating a dynamic function list for each target volume, the dynamic function list including a list of functions in which the target volume is associated;
quiescing any processes active in the storage subsystem after receipt of the CMT request;
for each target volume, invoking each function in the dynamic function list on the respective target volumes whereby the metadata tracks are cleared substantially in parallel; and
resuming the quiesced processes after the identified metadata tracks have been cleared.

13. The method of claim 12, wherein invoking each function in the dynamic function list comprises:
generating a task control block (TCB) for each target volume, the TCB including the list of functions with which the target volume is associated; and
executing the TCB for each target volume.

14. The method of claim 12, wherein the functions in the function list comprise copy services functions selected from a group comprising flash copy, peer-to-peer remote copy, extended remote copy and concurrent copy.

15. The method of claim 12, further comprising, after receipt of the CMT request and before quiescing any active processes:
transmitting an acknowledgement of receipt of the CMT request to the client; and
receiving a quiesce command from the client to initiate performance of the quiescing of active processes.

16. A storage subsystem for clearing metadata, comprising:
a storage controller coupled to a host device;
at least one direct access storage device (DASD) configured into tracks having customer data and metadata;
a cache storage;
a nonvolatile journaling storage;
means for receiving a request to clear identified metadata stored on the at least one direct access storage device (DASD), the request including an identification of a metadata type and an identification of one or more metadata tracks associated with the metadata type, the type of metadata selected from a group consisting of a storage controller level, a logical subsystem level and a volume level; and
metadata management code, comprising:
means for directing that any processes active in the storage subsystem be quiesced after receipt of the CMT request;
means for directing that the identified metadata tracks be cleared substantially in parallel; and
means for directing that the quiesced processes be resumed after the identified metadata tracks have been cleared.

17. The storage subsystem of claim 16, further comprising one or more in-memory structures, each comprising an identified metadata type and the one or more metadata tracks associated with the metadata type.

18. The storage subsystem of claim 16, further comprising one or more in-memory structures, each comprising an identified metadata track and an identified metadata type with which the metadata track is associated.

19. The storage subsystem of claim 16, wherein the request comprises a single clear metadata tracks (CMT) command executable to clear all metadata tracks on the storage subsystem without affecting storage subsystem configuration data.

20. The storage subsystem of claim 19, further comprising:
an in-memory structure containing an identifying one or more metadata tracks associated with a metadata type; and the metadata management code further comprises means for setting an indication in the structure that all metadata tracks are to be cleared upon receipt of the CMT request.

21. The storage subsystem of claim 16, wherein one or more volumes is a target of the clear metadata tracks (CMT) request, the metadata management code further comprising:
means for generating a dynamic function list for each target volume after receiving the CMT request, the dynamic function list including a list of functions in which the target volume is associated; and
means for invoking each function in the dynamic function list on the respective target volumes in response to the CMT request.

22. The storage subsystem of claim 21, wherein the functions in the function list comprise copy services functions selected from a group comprising flash copy, peer-to-peer remote copy, extended remote copy and concurrent copy.

23. A computer program product of a non-transitory computer readable medium usable with a programmable computer, the computer program product having computer-readable code embodied therein for clearing metadata in a storage subsystem, the computer-readable code comprising instructions for:
identifying one or more of a plurality of types of metadata tracks, stored on a direct access storage device (DASD) in the storage subsystem, to clear, the direct access storage device configured into tracks having customer data and metadata and the type of metadata selected from a group consisting of a storage controller level, a logical subsystem level and a volume level;
receiving a clear metadata tracks (CMT) request from a client to clear metadata tracks, the CMT request including an identification of a metadata type and an identification of one or more metadata tracks associated with the metadata type;
quiescing any processes active in the storage subsystem after receipt of the CMT request;
clearing the identified metadata tracks substantially in parallel; and
resuming the quiesced processes after the identified metadata tracks have been cleared.

24. The computer program product of claim 23, further comprising instructions for creating one or more in-memory structures, each containing an identified metadata type and the one or more metadata tracks associated with the metadata type.

25. The computer program product of claim 23, further comprising instructions for creating one or more in-memory structures, each containing an identified metadata track and an identified metadata type with which the metadata track is associated.

26. The computer program product of claim 23, further comprising instructions for:
transmitting an acknowledgement of receipt of the CMT request after receipt of the CMT request and before quiescing any active processes; and
receiving a quiesce command from the client to initiate performance of the quiescing of active processes.

27. The computer program product of claim 23, wherein the request comprises a single CMT command executable to clear all metadata tracks on the storage subsystem without affecting storage subsystem configuration data.

28. The computer program product of claim 27, further comprising instructions for:
creating an in-memory structure containing an identifying one or more metadata tracks associated with a metadata type; and
upon receipt of the CMT request, setting an indication in the structure that all metadata tracks are to be cleared.

29. The computer program product of claim 23, wherein one or more volumes is a target of the CMT request, the method further comprising:
after receiving the CMT request, generating a dynamic function list for each target volume, the dynamic function list including a list of functions in which the target volume is associated; and
in response to the CMT request, invoking each function in the dynamic function list on the respective target volumes.

30. The computer program product of claim 29, wherein the functions in the function list comprise copy services functions selected from a group comprising flash copy, peer-to-peer remote copy, extended remote copy and concurrent copy.

31. A method for deploying computing infrastructure, comprising integrating computer readable code into a computing system, wherein the code, in combination with the computing system, is capable of performing the following:
identifying one or more of a plurality of types of metadata tracks, stored on a storage device in the storage subsystem, to clear, the type of metadata selected from a group consisting of a storage controller level, a logical subsystem level and a volume level;
receiving a clear metadata tracks (CMT) request from a client to clear metadata tracks, the CMT request including an identification of a metadata type and an identification of one or more metadata tracks associated with the metadata type;
quiescing any processes active in the storage subsystem after receipt of the CMT request;
clearing the identified metadata tracks substantially in parallel; and
resuming the quiesced processes after the identified metadata tracks have been cleared.

32. The method of claim 31, wherein the code, in combination with the computing system, is further capable of creating one or more in-memory structures, each containing an identified metadata type and the one or more metadata tracks associated with the metadata type.

33. The method of claim 31, wherein the code, in combination with the computing system, is further capable of creating one or more in-memory structures, each containing an identified metadata track and an identified metadata type with which the metadata track is associated.

34. The method of claim 31, wherein the code, in combination with the computing system, is further capable of performing the following after receipt of the CMT request and before quiescing any active processes:
transmitting an acknowledgement of receipt of the CMT request to the client; and
receiving a quiesce command from the client to initiate performance of the quiescing of active processes.

35. The method of claim 31, wherein the request comprises a single CMT command executable to clear all metadata tracks on the storage subsystem without affecting storage subsystem configuration data.

36. The method of claim 35, wherein the code, in combination with the computing system, is further capable of performing the following:
creating an in-memory structure containing an identifying one or more metadata tracks associated with a metadata type; and
upon receipt of the CMT request, setting an indication in the structure that all metadata tracks are to be cleared.

37. The method of claim 31, wherein one or more volumes is a target of the CMT request, the method further comprising:

after receiving the CMT request, generating a dynamic function list for each target volume, the dynamic function list including a list of functions in which the target volume is associated; and in response to the CMT request, invoking each function in the dynamic function list on the respective target volumes.

38. The method of claim 37, wherein the functions in the function list comprise copy services functions selected from a group comprising flash copy, peer-to-peer remote copy, extended remote copy and concurrent copy.

\* \* \* \* \*